(12) United States Patent   (10) Patent No.: US 9,329,299 B2
Dell'Aversana et al.   (45) Date of Patent: May 3, 2016

(54) DETECTION SYSTEM OF GEOLOGICAL FORMATIONS

(75) Inventors: Paolo Dell'Aversana, Milan (IT); Massimo Zampato, Salzano (IT)

(73) Assignee: ENI S.p.A., Rome (IT)

( * ) Notice: Subject to any disclaimer, the term of this patent is extended or adjusted under 35 U.S.C. 154(b) by 156 days.

(21) Appl. No.: 13/985,207

(22) PCT Filed: Feb. 15, 2012

(86) PCT No.: PCT/EP2012/052602
§ 371 (c)(1), (2), (4) Date: Oct. 24, 2013

(87) PCT Pub. No.: WO2012/110561
PCT Pub. Date: Aug. 23, 2012

(65) Prior Publication Data
US 2014/0035589 A1   Feb. 6, 2014

(30) Foreign Application Priority Data
Feb. 16, 2011 (IT) .............. MI2011A0228

(51) Int. Cl.
*G01V 3/00* (2006.01)
*G01V 3/30* (2006.01)
*G01V 3/28* (2006.01)

(52) U.S. Cl.
CPC ... *G01V 3/30* (2013.01); *G01V 3/28* (2013.01)

(58) Field of Classification Search
CPC ............. G01V 3/28; G01V 3/30; G01V 3/32; G01V 3/083; G01V 3/12; G01V 3/17; G01V 1/16; G01V 1/42; G01V 3/26; G01V 3/104; G01V 3/08; G01V 3/082; G01V 3/15; G01V 3/38; G01N 24/081; G01R 33/5601; G01S 13/885; G01S 13/89; E21B 17/028; E21B 43/2401; E21B 7/06; E21B 7/208; E21B 21/103
See application file for complete search history.

(56) References Cited

U.S. PATENT DOCUMENTS 5,189,415 A   2/1993   Shimada et al.
6,018,501 A * 1/2000   Smith et al. .................. 367/134
(Continued)

FOREIGN PATENT DOCUMENTS

CN   1418316 A   5/2003
CN   1677128 A   10/2005
(Continued)

OTHER PUBLICATIONS

International Search Report and Written Opinion issued May 21, 2012 in PCT/EP2012/052602.
Combined Office Action and Search Report issued Jul. 13, 2015 in Chinese Patent Application No. 201280008655.2 (with English language translation).
Decision to Grant issued Jan. 12, 2016 in Russian Patent Application No. 2013139628/28(060133) (with English translation of Description and accepted claims).

*Primary Examiner* — Vinh Nguyen
(74) *Attorney, Agent, or Firm* — Oblon, McClelland, Maier & Neustadt, L.L.P.

(57) ABSTRACT

A detection system of geological formations, particularly but not exclusively used for oil exploration, and for characterization and monitoring of hydrocarbon reservoirs. The detection system includes an electromagnetic transmission device positioned on a surface of a geological formation close to a first well having a vertical development direction, the first well being covered by a metal casing, and an electromagnetic reception device positioned deep inside the first well, the electromagnetic reception device including an electromagnetic detector. The electromagnetic transmission device includes a primary electromagnetic field generator configured to generate a primary electromagnetic field focalized in a direction of the metal casing, the metal casing irradiating the primary electromagnetic field into the geological formation.

8 Claims, 5 Drawing Sheets

(56) References Cited

U.S. PATENT DOCUMENTS

| | | |
|---|---|---|
| 6,509,738 B1 | 1/2003 | Minerbo et al. |
| 6,556,014 B1* | 4/2003 | Kong et al. ............. 324/338 |
| 6,628,206 B1* | 9/2003 | Soulier ................ 340/854.4 |
| 2002/0195247 A1* | 12/2002 | Ciglenec et al. ....... 166/250.11 |
| 2004/0238177 A1* | 12/2004 | Fossli ..................... 166/364 |
| 2005/0083063 A1* | 4/2005 | Omeragic et al. ......... 324/338 |
| 2005/0189945 A1 | 9/2005 | Reiderman |
| 2005/0212520 A1 | 9/2005 | Homan et al. |
| 2006/0186887 A1* | 8/2006 | Strack et al. ............. 324/336 |
| 2007/0000667 A1* | 1/2007 | MacKenzie et al. ......... 166/345 |
| 2008/0290873 A1 | 11/2008 | Homan et al. |
| 2010/0231220 A1 | 9/2010 | Alumbaugh et al. |

FOREIGN PATENT DOCUMENTS

| | | |
|---|---|---|
| CN | 101542318 A | 9/2009 |
| CN | 101571040 A | 11/2009 |
| EA | 001862 B1 | 10/2001 |
| RU | 2377608 C2 | 12/2009 |

\* cited by examiner

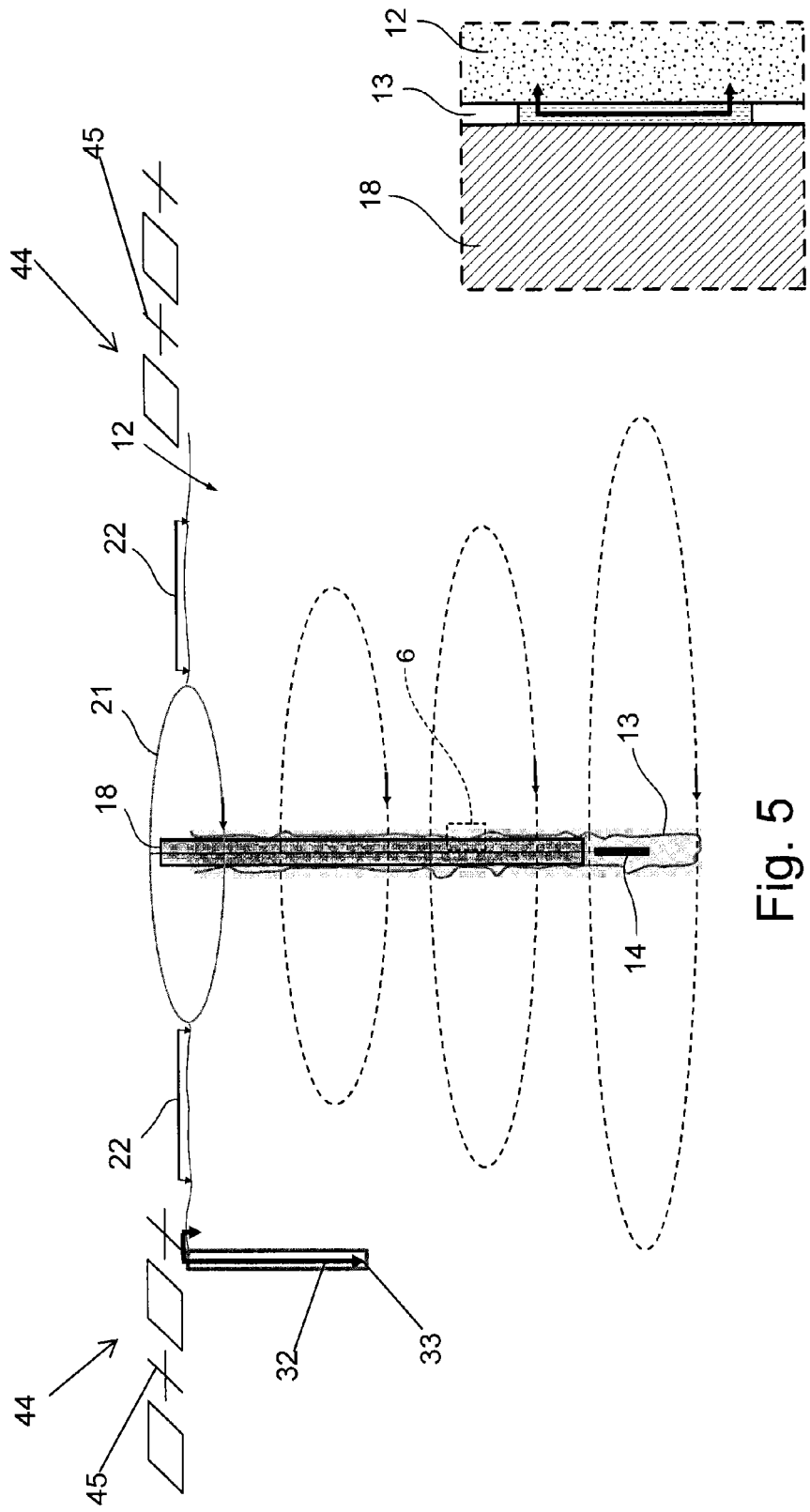

DETECTION SYSTEM OF GEOLOGICAL FORMATIONS

Embodiments of the disclosed subject matter relate to a detection system of geological formations particularly but not exclusively used for oil exploration, and also for the characterization and monitoring of hydrocarbon reservoirs.

In the field of oil exploration, the application of survey methods aimed at reconstructing the morphology and nature of the subsoil close to a hydrocarbon reservoir, is known.

Over the years, survey methods based on the response received from the subsoil itself to an electromagnetic excitation have proved to be particularly successful.

For this purpose, an electromagnetic field is generated and the electromagnetic response of the subsoil is registered, whose intensity and phase depend on the electric conductivity of the means encountered during the propagation route.

The electric resistivity (inverse of conductivity) of the rock formation, on the other hand, depends on various factors such as the saturation degree, salinity of the water present in the geological formations, the mineralogical composition and so forth.

A measurement of the electric resistivity of the various layers forming the rocky formation and consequently information on the composition of the same can therefore be obtained from the detection of a secondary electromagnetic field.

Considering that hydrocarbons are much less conductive and therefore more resistive than normal sedimentary rock, impregnated with water, electromagnetic survey methods allow a hydrocarbon reservoir to be localized, also providing a guide for the drilling and monitoring of the streams around the extraction well.

For effecting electromagnetic survey methods, the use of detection systems comprising a transmission device and electromagnetic reception device, is known.

It is known that electromagnetic transmission devices can comprise one or more electric dipoles, or at least a metallic coil through which an alternating current passes, for the generation of the electromagnetic field of the survey, whereas the reception devices normally comprise an electric quadrupole associated with at least one magnetometer.

These detection systems are capable of reaching various degrees of spatial resolution and/or penetration depth depending on the intensity and frequency of the electromagnetic field generated for the survey.

These parameters are substantially linked to the arrangement of the transmission and electromagnetic reception devices included in the detection system.

More specifically, a first type of detection system comprises an electromagnetic transmission device situated in depth inside an extraction well and an electromagnetic reception device placed on the surface of the surrounding geological formation.

In this case, the electromagnetic field generated in depth inside the well propagates inside the above geological formation, until it is detected by the electromagnetic reception device situated on the surface.

In the limited space of the extraction well, large-dimensioned electromagnetic transmission devices cannot be installed and this does not allow to generate an electromagnetic field of such an intensity as to enable it to be revealed on the surface, after it has propagated through the geological formation.

Under these conditions, in order to ensure that the electromagnetic generated field can propagate in the subsoil and be detected on the surface, without being confused with a noise signal, it is therefore necessary to generate low-frequency electromagnetic fields, which obviously allow a low spatial resolution of the electric conductivity measurement. With the detection systems of the first type, it is therefore not possible to obtain measurements with a good spatial resolution, in a wide area around the extraction well.

Detection systems of a second type, on the other hand, comprise an electromagnetic transmission device situated on the surface of the geological formation, close to an extraction well and an electromagnetic reception device placed in depth inside the well itself.

In this case, there is no restriction on the dimensions of the transmission device and therefore on the intensity of the electromagnetic field generated by the latter. High-intensity electromagnetic fields which are capable of propagating in depth in the geological formation, can therefore be transmitted. The propagation of the electromagnetic field inside the geological formation, however, is normally accompanied by a high attenuation, and consequently accurate measurements relating to very deep areas and distant from the electromagnetic reception device, cannot be obtained.

Detection systems of a third type comprise a transmission device and an electromagnetic reception device, generally comprising a pair of bobbins both situated in depth inside the extraction well.

In this case, high spatial resolution conductivity measurements can only be effected for rock formations immediately close to the extraction well, as high-intensity electromagnetic fields cannot be generated due to the limited space in which the transmission device is installed and as a result of the mutual inductance which is established between the transmission devices and electromagnetic reception devices.

It is important to point out that all the detection systems so far mentioned do not allow to effect measurements in real time during the drilling of the well, as they depend on the functioning of at least one device positioned inside the well itself.

An objective of one or more embodiments of the present disclosure is to overcome the drawbacks indicated above and, in particular, to provide a detection system of geological formations which is capable of supplying a combination of measurements which are sufficiently accurate for the three-dimensional characterization of the geometry of a rock formation, for example close to a hydrocarbon reservoir.

Another objective of one or more embodiments of the present disclosure is to provide a detection system of geological formations which allows the evolution of a hydrocarbon reservoir with time to be monitored through detections in real time.

These and other objectives according to one or more embodiments of the present can be achieved by providing a detection system of geological formations as claimed herein, for instance.

Characteristics and advantages of a detection system of geological formations according to one or more embodiments of the present disclosure will appear more evident from the following illustrative and non-limiting description, referring to the enclosed schematic drawings in which:

FIG. 5 is a schematic view of the system of FIG. 4 with a surface reception device;

FIG. 6 is a diagrammatic illustration of an example of a cover of isolating material wrapping at least partly around the metal casing according to an embodiment of the present disclosure.

Figure 1:
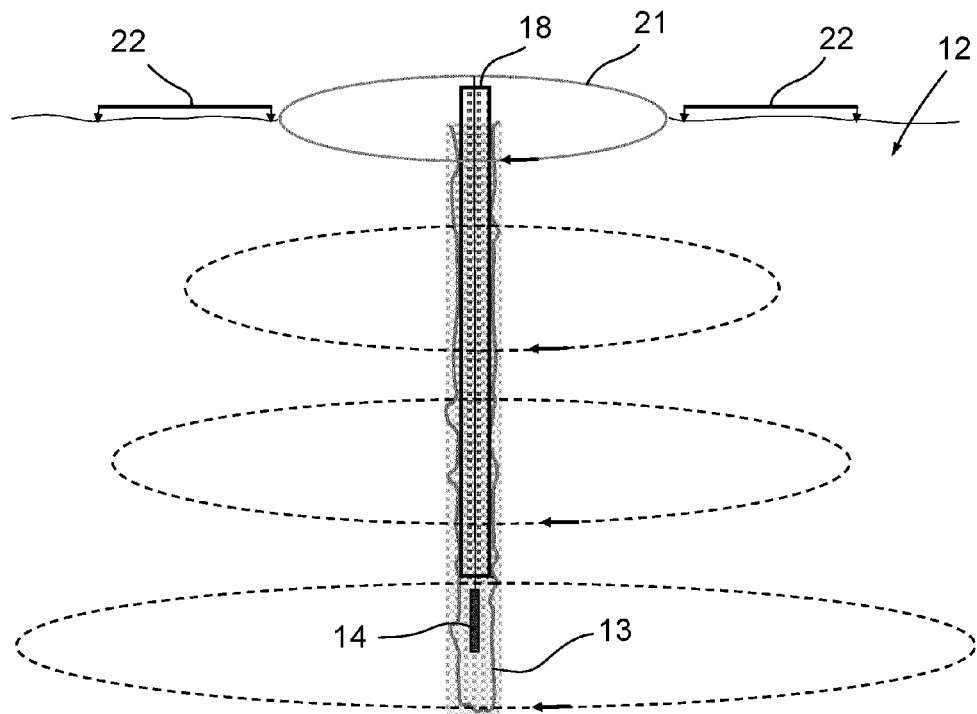
FIG. 1 is a schematic view of an embodiment of a detection system according to the present disclosure.
Figure 2:
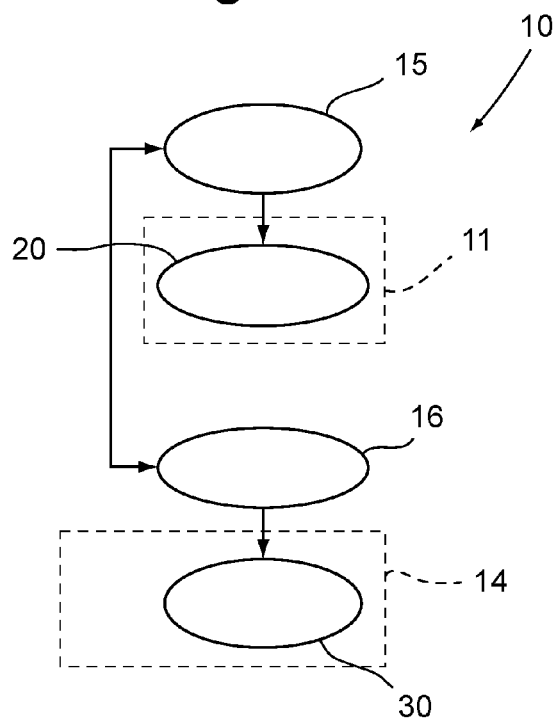
FIG. 2 is a block scheme of the detection system of FIG. 1.
Figure 3:
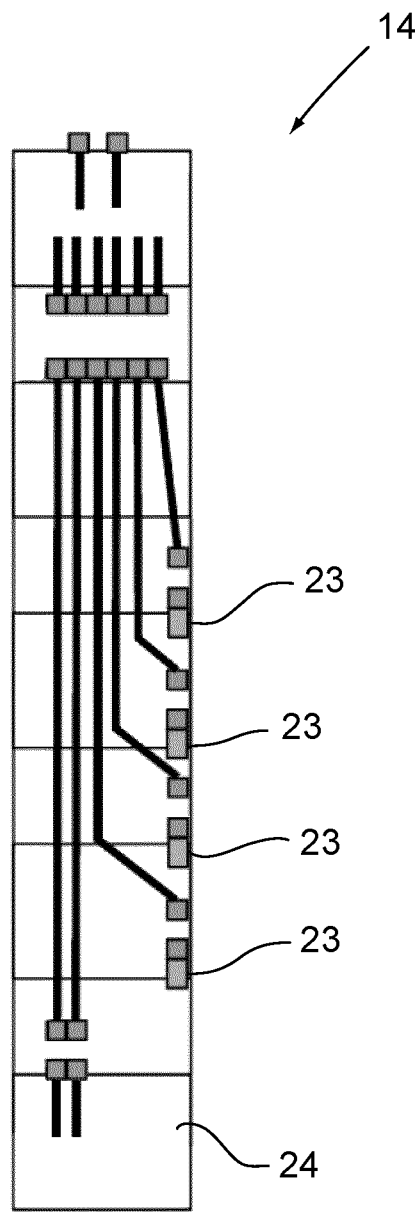
FIG. 3 is a schematic view of an embodiment of a reception device included in the detection system of FIG. 1.

With reference to the figures, the figures show a detection system of geological formations 10 which comprises an electromagnetic transmission device 11 positioned on the surface of a geological formation 12 close to a first well 13, having a vertical development direction, and an electromagnetic reception device 14, positioned in depth inside the above first well 13.

More specifically, the well 13 is covered by a metallic casing 18, which extends for almost the whole extension of the well itself 13.

The electromagnetic transmission device 11 is connected to a first processing unit 15, for the control and electric feeding of the transmission device itself 11; this first processing unit 15 is also situated on the surface.

Analogously, the reception device 14 is connected to a second processing unit 16 for the control and power supply of the reception device 14, and also for the acquisition and processing of the data collected by the same.

This second processing unit 16 is situated in the first well 13, close to the reception device 14.

The first 15 and second 16 processing unit are mutually connected by means of umbilical cables (not illustrated) which serve to transmit data and power.

According to one or more embodiments of the present disclosure, the transmission device 11 comprises electromagnetic field generating means 20 capable of generating a primary electromagnetic field focalized in the direction of the metallic casing 18.

In a first embodiment according to the present disclosure, said electromagnetic field generating means 20 comprise at least a first metallic coil 21, preferably having a diameter of about 200 meters, concentric with the first well 13.

In addition or alternatively to the at least one metallic coil 21, the electromagnetic field generating means 20 comprise at least a pair of electric dipoles 22, situated in parallel to the surface of the geological formation 12 and positioned symmetrically with respect to the first well 13.

The electromagnetic field generating means 20 preferably comprise two pairs of electric dipoles, illustrated in FIG. 1 (and FIGS. 4 and 5), orthogonal with each other in pairs and all parallel with the surface plane of the geological formation 12.

Figure 4:
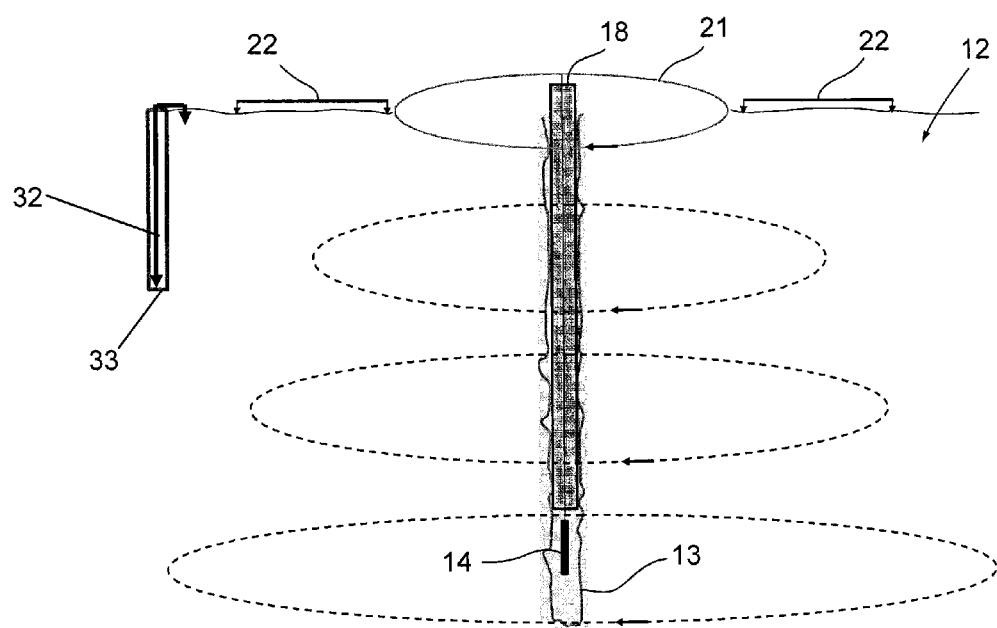
FIG. 4 is a schematic view of another embodiment of a detection system according to the present disclosure.

The electromagnetic field generating means 20 preferably comprise, in addition to the two pairs of electric dipoles, a third electric dipole 32 situated in a second well 33 having a vertical development, such as illustrated diagrammatically in FIGS. 4 and 5 preferably not more than 100-200 meters deep; this third dipole is situated in parallel to said development direction.

In any case, the electromagnetic field generating means 20 can operate in the domain of time, in the domain of frequency or in direct current.

The reception device 14 comprises detection means of the electromagnetic field 30 which preferably comprise a plurality of electrodes coaxial with the first well 13 and arranged so as to generate at least three electric dipoles 23, capable of measuring the component of the electric field along the direction of the vertical development of the first well 13, in addition to the gradient of said field in a vertical direction.

Said electrodes coaxial are positioned on a cover in isolating material that wraps at least partly the metallic casing 18.

In this way, the electrodes are electrically isolated by the metallic casing 18 and at the same time in electric contact with rock formation of first well 13.

Depending on depth position, electrodes could allow, in the course of time, a monitoring of saturation changing in the hydrocarbon reservoir.

The electric dipoles 23 included in the reception device 14 must be positioned in the first well 13 outside the metallic casing 18 otherwise they would measure a zero electric field.

The electromagnetic field detection means 30 also comprise at least one magnetometer 24, preferably a second metallic coil, sensitive to the vertical component of the magnetic field. The magnetometer can be positioned either inside or outside the metallic casing 18.

If the electromagnetic field detection means 30 includes two or more magnetometers situated along the vertical development direction of the first well 13, the gradient of the magnetic field can also be revealed in this direction.

In a detection system according to another embodiment of the present disclosure, the detection system 10 also comprises a surface reception device 44, such as illustrated diagrammatically in FIG. 5, situated on the surface of the geological formation 12 and comprising surface detection means 45.

These surface detection means 45 preferably comprise at least three electric dipoles and at least one magnetometer.

Figure 7:
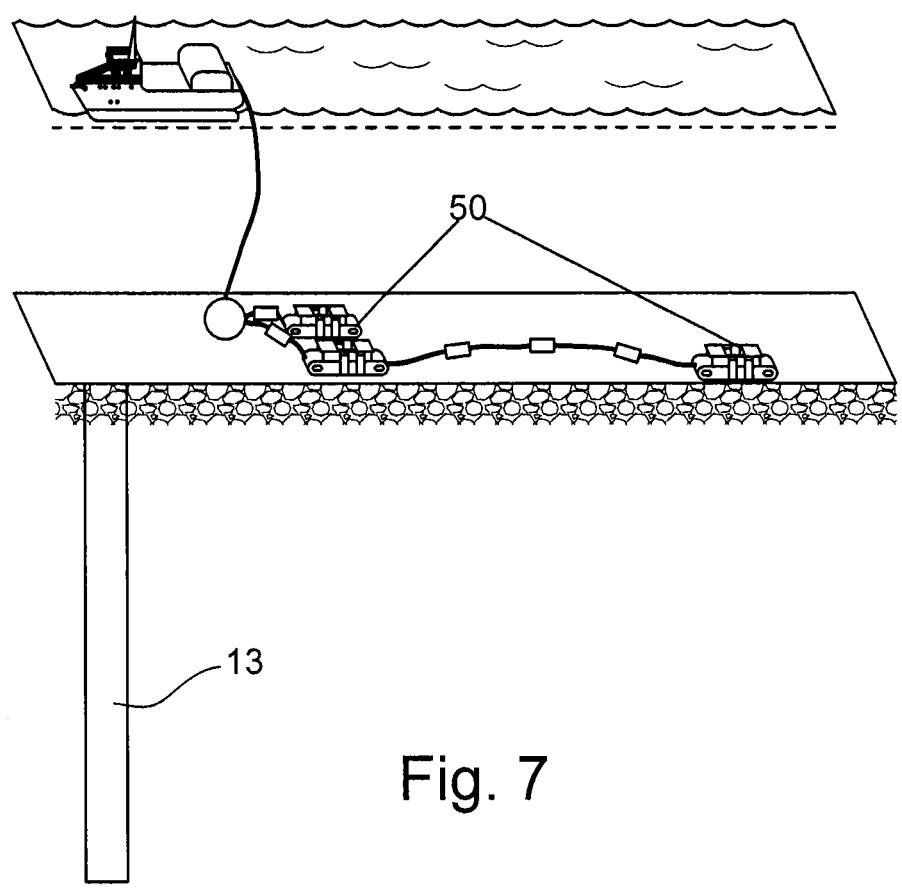
FIG. 7 is a diagrammatic illustration of an example of submarine equipment according to an embodiment of the present disclosure.

According to an alternative embodiment, the detection system 10 of geological formations comprises submarine equipment 50, such as illustrated diagrammatically in FIG. 7, suitable for containing and positioning the electromagnetic transmission device on the seabed if the extraction well is an underwater well.

The functioning of the detection system 10 of geological formations is as follows.

The transmission device 11 is fed by the first processing unit 15 and emits a high-intensity primary electromagnetic field generated by the electromagnetic field generating means 20.

The primary electromagnetic field emitted by the transmission device 11 can be either high- or low-frequency depending on the requirements in terms of spectral resolution and survey depth. Reference is made hereafter, for illustrative and non-limiting purposes, to a low-frequency primary electromagnetic field.

In this case, however, although the emission of the electromagnetic field takes place at a low frequency, natural high-frequency harmonics are produced spontaneously, which can be detected with the same receivers, and used for detailed surveys.

The electromagnetic field generating means 20 are advantageously capable of creating a primary electromagnetic field focalized in the direction of the metallic casing 18.

Said primary electromagnetic field propagates in depth into the well 13 and is coupled with the metallic casing 18.

The metallic casing 18 subjected to the primary electromagnetic field acts as if it were an antenna irradiating the same at different depths as illustrated in FIGS. 1, 4 and 5, for instance; this effect is favoured by the high magnetic permeability that the metallic casing 18 has.

In this way, the detection system 10 acts as if it had a plurality of sources along the walls of the first well 13, maintaining however the advantages deriving from the external positioning of the electromagnetic field generating means 20.

The electromagnetic field irradiated by the metallic casing 18 generates a plurality of eddy currents which circulate in the geological formation 12 surrounding the first well 13.

These eddy currents originate a secondary electromagnetic field, whose intensity and phase depend on the electromagnetic properties of the rock layers forming the geological formation 12 and through which the eddy currents have passed.

The secondary electromagnetic field is advantageously detected by the reception device 14 situated in the first well 13 at such a level of intensity as to be able to be distinguished by the noise.

In particular, the electromagnetic field detection means 30 included in the reception device 14 are sensitive to the component along the vertical direction of the electric field and magnetic field.

It is evident that in this way the position of the horizontal geological interfaces can be detected. In correspondence with these geological discontinuity surfaces, in fact, a discontinuity of charges is created, under the action of an electromagnetic field, and consequently an electric field discontinuity in its orthogonal component at the interfaces themselves. The second processing unit 16 receives the data relating to the measurements effected by the reception device 14 and calculates the gradient along the vertical direction of the electric field and magnetic field which are therefore measured.

The measurement of the electric gradient allows the presence of geological interfaces to be predicted before the well reaches them.

Furthermore, this second processing unit 16, on the basis of the data revealed, effects a processing procedure through which the spatial distribution of the electric properties of the layers forming the geological formation 12 is obtained together with the localization of the discontinuity surfaces present between the layers themselves.

In order to guarantee that the information on the geological formation 12 is complete, a plurality of detections are effected in correspondence with primary electromagnetic fields generated at different frequencies.

In this case, the electromagnetic field generating means 20 emits electromagnetic fields varying the frequencies of the same with time.

In this way, the response of the geological formation 12 can be detected also with respect to electromagnetic fields at different frequencies.

It should also be pointed out that the survey effected by the detection system 10 can provide information on rock formations at a distance of even hundreds of meters from the first well 13.

If the electromagnetic field generating means 20 comprise a third electric dipole 32, in addition to the two pairs of electric dipoles 22 orthogonal to each other, such as illustrated diagrammatically in FIGS. 4 and 5, a three-dimensional characterization of the geological formation 12 can also be obtained.

In this case, in fact, polarized electromagnetic fields are generated along the three directions of the Cartesian space, which by their very nature are sensitive to electric discontinuities along the respective polarization directions.

If the detection system 10 is equipped with a surface reception device 44, comprising surface detection means 45 distributed over a vast surface area of the geological formation 12, such as illustrated diagrammatically in FIG. 5, the metallic casing 18 sustains the secondary electromagnetic field so that it can be revealed on the surface without being confused with the noise signal.

The data revealed by the reception device are processed by the first processing unit 15, on the basis of a procedure analogous to that effected by the second processing unit 16 on the data revealed by the first reception device 14.

The electromagnetic fields induced on the metallic casing 18, induce electric currents that, with appropriate intensities and frequencies, tend to heat the metallic casing 18 by Joule effect.

This heating effect could represent a heat source, induced in an electromagnetic way, able to heat geological formations surrounding the well. In this way, it's possible to optimize the recovery factor of heavy oils, heating the hydrocarbon reservoir so to reduce significantly the oil viscosity, and favouring the oil extraction.

The characteristics of the detection system of geological formations, object of one or more embodiments of the present disclosure, as also the relative advantages, are evident from the above description.

In fact, the combined use of a reception device situated in the first well and electromagnetic field generating means capable of generating electromagnetic fields focalized in the direction of the metallic casing, allows to obtain a map of the resistivity of the geological formation not only close to the well but also within an extremely extensive area surrounding it.

The metallic casing, in fact, acts as a secondary field source sustaining and irradiating the primary electromagnetic field at different depths.

The primary electromagnetic field focalized in correspondence with the well can in fact propagate in depth undergoing less attenuation than it would undergo during propagation in the geological formation. This allows an irradiation of high-intensity electromagnetic field also at very great depths.

The positioning of the reception device in depth inside the first well improves the resolution of detections for rock formations immediately close to the well.

Furthermore, if a surface reception device is present, a characterization of the geological formation surrounding the well can be obtained also during drilling.

This allows drilling procedures to be guided in order to maximize the extraction of hydrocarbons.

Finally, the detection system of geological formations thus conceived can undergo numerous modifications and variants, all included in one or more embodiments of the disclosed subject matter; furthermore, all the details can be substituted by technically equivalent elements. In practice, the materials used, as also the dimensions, can vary according to technical requirements.

The invention claimed is:

1. A detection system of geological formations comprising:
   an electromagnetic transmission device positioned on an above-ground surface of a geological formation adjacent a first well having a vertical development direction, a metal casing covering a portion of the first well; and
   an electromagnetic receiving device positioned at a depth inside the first well, below a surface plane of the above-ground surface of the geological formation, the electromagnetic receiving device including electromagnetic detection circuitry,
   wherein the electromagnetic transmission device includes electromagnetic field generating circuitry configured to generate a primary electromagnetic field focalized in a direction of the metal casing, the metal casing being configured to irradiate the primary electromagnetic field in the geological formation, and
   wherein the electromagnetic field generating circuitry has two pairs of electric dipoles orthogonal to each other in twos and parallel to the surface plane of the geological formation and a third electric dipole situated along the vertical development direction of the first well and positioned in a second well adjacent to the first well.

2. The detection system of geological formations according to claim 1, wherein the electromagnetic field generating circuitry further has at least a first metallic coil coaxial with respect to the first well.

3. The detection system of geological formations according to claim 1, wherein at least a pair of electric dipoles, of said two pairs, is situated parallel to the surface plane of the geological formation, in symmetrical positions with respect to the first well.

4. The detection system of geological formations according to claim 1, wherein the electromagnetic detection circuitry is configured to detect an electromagnetic field, has a plurality of electrodes coaxial with the first well, and is further configured to generate at least three electric dipoles.

5. The detection system of geological formations according to claim 4, wherein the electromagnetic detection circuitry has at least one magnetometer.

6. The detection system of geological formations according to claim 4, further comprising a surface reception device including surface detection circuitry.

7. The detection system of geological formations according to claim 1, further comprising submarine apparatuses configured to contain and position the electromagnetic transmission device on a seabed when the first well is an underwater well.

8. The detection system of geological formations according to claim 4, wherein the coaxial electrodes are positioned on a cover in isolating material that wraps at least partly around the metal casing.

\* \* \* \* \*